No. 838,456. PATENTED DEC. 11, 1906.
R. RICHARDS.
CAGE FOR PICKLING VATS.
APPLICATION FILED SEPT. 6, 1906.
2 SHEETS—SHEET 1.
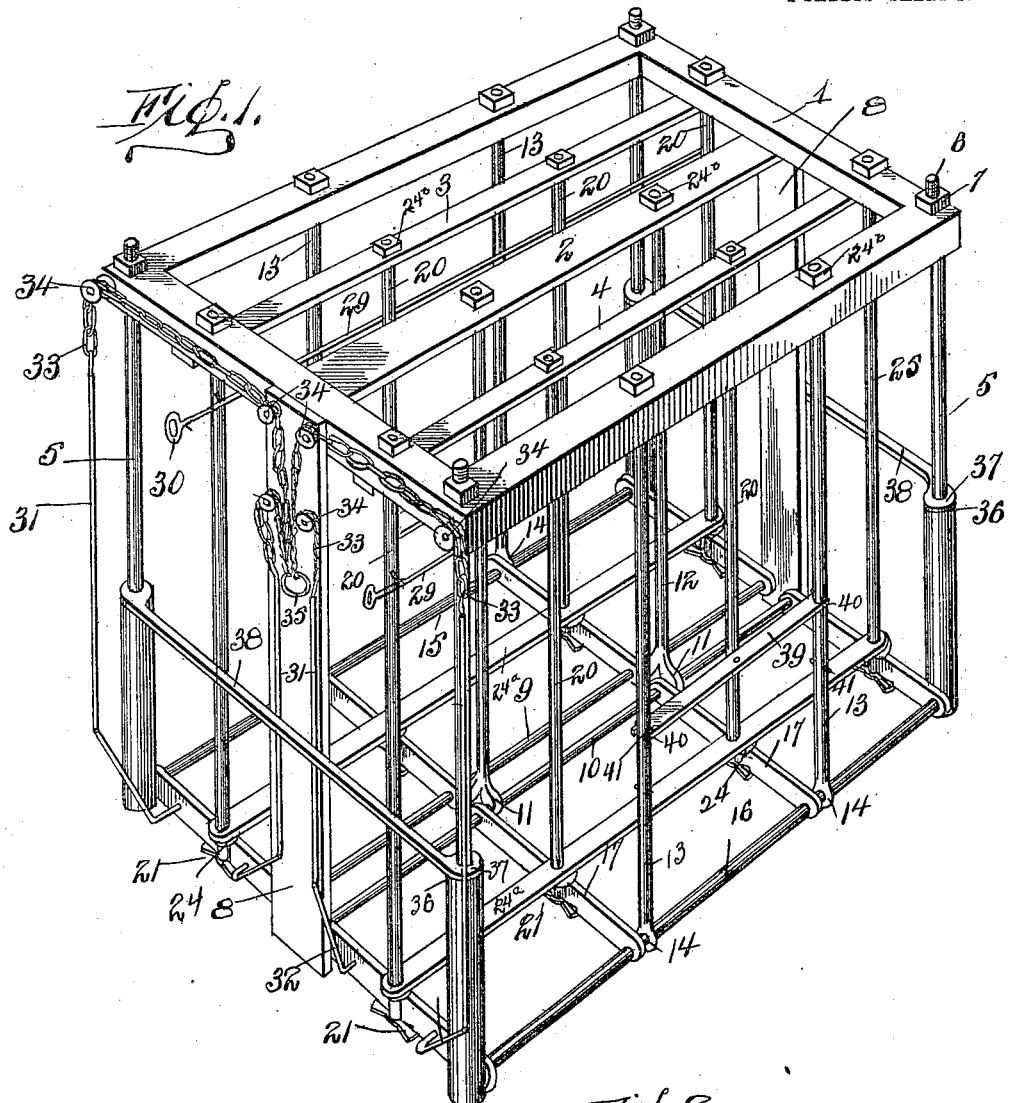
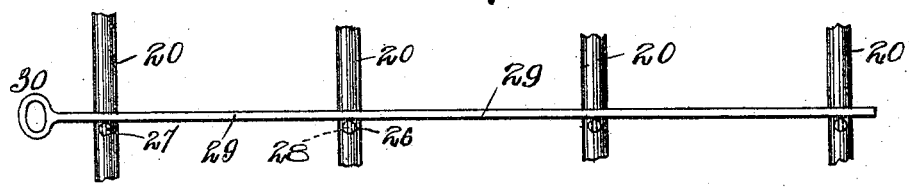
Witnesses:
Jesse C. Miller.
J. O. McCleary.
Inventor:
Richard Richards.
by H. C. Everett
Attorneys.

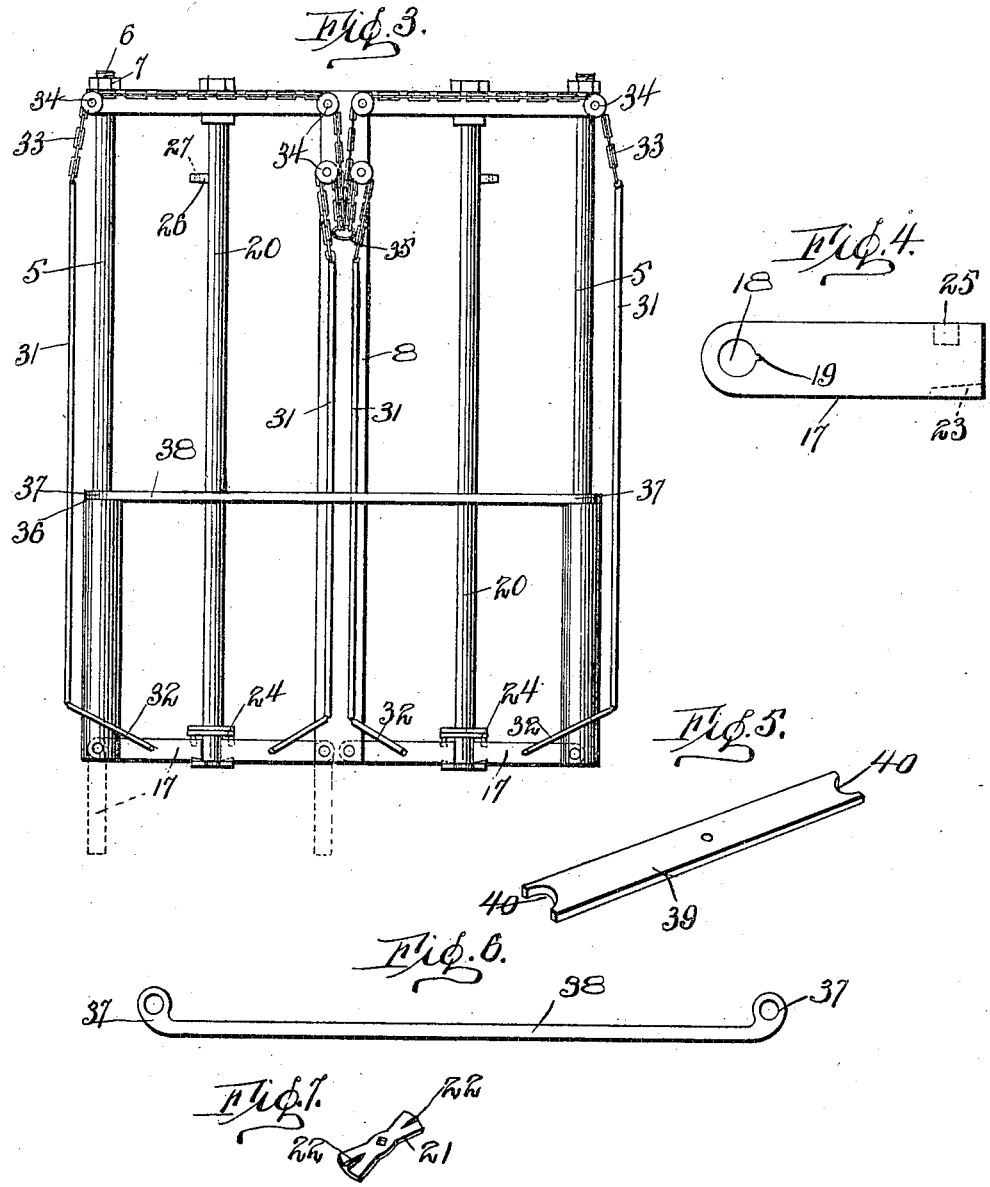

UNITED STATES PATENT OFFICE.

RICHARD RICHARDS, OF NEW CASTLE, PENNSYLVANIA, ASSIGNOR OF ONE-FOURTH TO H. P. MARLEY, OF NEW CASTLE, PENNSYLVANIA.

CAGE FOR PICKLING-VATS.

No. 838,456.     Specification of Letters Patent.     Patented Dec. 11, 1906.

Application filed September 6, 1906. Serial No. 333,477.

*To all whom it may concern:*

Be it known that I, RICHARD RICHARDS, a citizen of the United States of America, residing at New Castle, in the county of Lawrence and State of Pennsylvania, have invented certain new and useful Improvements in Cages for Pickling-Vats, of which the following is a specification, reference being had therein to the accompanying drawings.

This invention relates to cages for transferring tin plates from the pickling-vat to the "bosh" or water-tank.

The work of removing tin plates from the pickling-vats to the bosh is now done by hand; and the primary object of the present invention is to provide a cage or holder adapted to receive the plates of tin and support the same within the pickling-vat, after which the cage or holder and its contents are raised bodily out of the vat and transferred to the bosh. The bottom of the cage is so constructed as to permit it to open to free the cage from its load, leaving the latter within the bosh and allowing the cage to be withdrawn, after which its bottom sections are closed to receive another load.

The construction of the improvement will be more fully described hereinafter in connection with the accompanying drawings, which form a part of this specification.

In the drawings, Figure 1 is a view in perspective of a cage embodying the invention. Fig. 2 is a detail of the means employed for turning the rods which support the tilting arms. Fig. 3 is an end elevation of the cage. Fig. 4 is a detail side elevation of one of the tilting arms. Fig. 5 is a detail perspective of a movable guard adapted to be applied to the sides of the cage. Fig. 6 is a top plan of another form of guard extending across the ends of the cage, and Fig. 7 is a detail perspective view of one of the necktie-catches employed to support the free ends of the tilting arms.

The reference-numeral 1 designates a rectangular frame the ends of which are connected by a central longitudinal bar 2 and parallel bars 3 and 4, arranged centrally between the bar 2 and the sides of the frame 1.

Depending from each corner of the frame 1 is a post 5, the upper ends 6 of which are threaded and extend through openings in the frame, being secured by nuts 7.

Depending centrally from each end of the frame 1 is a plate 8, each of which is formed adjacent to its lower end with bearings to receive the ends of parallel rock-shafts 9 and 10, said shafts being also supported in bearings formed in the diverging ends 11 of rods 12, secured at their upper ends to the central bar 2.

From each of the sides of the frame 1 depend two rods 13, formed at their lower ends with eyes or bearings 14 for rock-shafts 15 and 16, the ends of said shafts being supported in bearings formed in the lower ends of the corner-posts 5.

Upon each of the rock-shafts 9, 10, 15, and 16 are keyed a plurality of tilting arms 17, four being here shown on each shaft. These arms are each formed with an opening 18 for the passage of the rock-shafts and a key-seat 19 (see Fig. 4) to adapt them to be fixed upon said shafts. The arms 17 are oppositely disposed in pairs which aline longitudinally, the arms 17 on the shaft 16 being opposite those on the shaft 10, while the tilting arms 17 on the shaft 15 are opposite those on the shaft 9, the free ends of each pair being adjacent to each other to adapt them to be supported by a single fastener or support.

A series of rods 20 are suspended from the longitudinal bars 3 and 4 and from the end bars of the frame 1 in such a manner as to permit said rods to be turned radially a quarter-revolution, and upon the lower end of each of said rods is carried a catch or fastener adapted to detachably engage the free ends of the tilting arms. I have shown this fastener in the form of a necktie-catch button 21, each formed on its upper side at each end with an upwardly-projecting oppositely-beveled lug 22, said lugs being adapted to enter correspondingly-beveled recesses 23 on the under sides of the free ends of the tilting arms 17.

Each of the rods 20 is provided near its lower end with a collar 24, provided with a depending lug adapted to enter a slot 25, formed in the upper surface of the free end of each of the tilting arms to prevent lateral play of said arms.

It is necessary to provide means for turning the rods 20 a sufficient distance to disengage the catches 21 from the ends of the tilting arms, and for this purpose I provide each of the arms 20 with a laterally-projecting lug 26, formed with a vertical perforation 27 to receive pins 28, depending from the rod 29, the latter projecting at one end of the cage and being provided with a handle 30. Two of the rods 29 are shown, one controlling the rods 20, depending below the bar 3, and the other the rods depending below the bar 4.

When the necktie-catches are in the position shown in Fig. 1, the free ends of the arms 17 are in the horizontal position shown to support the tin plates which rest thereon on their edges. When the rods 20 are turned by pulling upon the rods 29, the catches 21 are turned a quarter of a revolution, which permits the arms to drop to the position shown by dotted lines in Fig. 3, thus releasing the cage from its load and allowing the cage to be withdrawn. The tilting arms 17 must be returned to their horizontal position in readiness to receive another load, and this may be accomplished by any desired mechanism, that here shown comprising rods 31, connected by links 32 to said arms, the upper ends of the rods being connected to chains 33, passing over guide-pulleys 34. Two sets of these arm-retracting devices are required for each series of pairs of tilting arms or four sets in all for the cage here shown. The chains 33 are preferably connected at the center of the end of the cage to a pull-ring 35, so that all of the tilting arms may be retracted at the same time.

Each of the corner-posts 5 is circumferentially reduced to form an annular shoulder 36, upon which are loosely supported the ends 37 of guards 38, said ends being formed with openings through which the upper reduced portions of the posts extend. These guards extend across the ends of the cage to retain the tin plates in position.

Removable guards 39, having their ends 40 recessed to fit the depending rods, may be employed to partially close the sides of the cage or to separate the stacks of plates within the cage. One of these guards 39 is shown in Fig. 1. They are supported upon pins 41, projecting from the vertical rods, and may be arranged at different heights with relation to the size of the plates to be treated.

The utility and operation of the improvement will be readily understood. The entire cage is adapted to be suspended by suitable means (not shown) and after being filled with tin plates is lowered into the pickling-vat. After remaining therein for the required time the cage and its contents are raised out of the vat and transferred to the bosh, the floor of which is provided with parallel cleats, upon which the lower edges of the tin plates rest. The arms 17 are then released by the means described for that purpose, after which the empty cage is raised out of the bosh, and the arms 17 are retracted, as already explained, and secured to the catches 20, ready for refilling.

Bars 24$^a$, formed with openings for the rods 20, rest on the collars 24 to keep said rods in alinement. The rods 20 are also threaded at their upper ends to receive nuts 24$^b$.

I would have it understood that the invention is not restricted to the details of the mechanism shown, but includes all such modifications and changes in the form and construction of the mechanism as may be resorted to without departing from the spirit and scope of the invention as set forth and defined in the following claims.

Having fully described my invention, what I claim as new, and desire to secure by Letters Patent, is—

1. A cage for supporting tin plates, comprising a skeleton structure, having a bottom consisting of a plurality of rock-shafts, and tilting arms secured upon said shafts, and means for securing and releasing the free ends of said arms.

2. A cage comprising a supporting-frame, vertically-disposed rods suspended from said frame and provided at their lower ends with bearings, shafts supported in said bearings, and tilting arms secured upon said shafts, and means for supporting the free ends of said arms, and for permitting them to drop by gravity.

3. A cage for tin plates, comprising a rectangular frame, vertical rods depending from said frame, a plurality of horizontal rock-shafts supported in bearings at the lower ends of said depending rods, tilting arms mounted on said shafts, and means for supporting and releasing the free ends of said arms.

4. A cage for tin plates, comprising a rectangular frame, vertical rods depending from said frame, a plurality of horizontal rock-shafts supported in bearings at the lower ends of said depending rods, tilting arms mounted on said shafts, and means for supporting and releasing the free ends of said arms, comprising vertically-disposed radially-movable rods and fastening devices secured to the lower ends of said rods.

5. A cage for tin plates, comprising a rectangular frame, vertical rods depending from said frame, a plurality of horizontal rock-shafts supported in bearings at the lower ends of said depending rods, tilting arms mounted on said shafts, and means for supporting and releasing the free ends of said arms, comprising vertically-disposed rods, fastening devices secured to the lower ends of said rods, and means for turning said rods.

6. A cage for tin plates, comprising a rectangular frame, vertical rods depending from said frame, a plurality of horizontal rock-shafts supported in bearings at the lower ends of said depending rods, tilting arms mounted on said shafts, and having their free ends recessed on their under sides, and means for supporting said arms comprising radially-movable rods and fastening-plates provided with projections fitting the recesses in the arms.

7. In a cage for supporting tin plates, the combination with a rectangular frame, and vertically-disposed rods carrying catches on their lower ends, of a pull-rod loosely connected to said rods and adapted to turn said rods.

In testimony whereof I affix my signature in the presence of two witnesses.

RICHARD RICHARDS.

Witnesses:
W. C. LEWIS,
F. G. MARLEY.